(12) United States Patent
Morita et al.

(10) Patent No.: US 10,956,843 B2
(45) Date of Patent: Mar. 23, 2021

(54) DETERMINING OPTIMAL DEVICE REFRESH CYCLES AND DEVICE REPAIRS THROUGH COGNITIVE ANALYSIS OF UNSTRUCTURED DATA AND DEVICE HEALTH SCORES

(71) Applicant: INTERNATIONAL BUSINESS MACHINES CORPORATION, Armonk, NY (US)

(72) Inventors: Gene Morita, Toronto (CA); Carl Satterfield, Jr., Charleston, SC (US); Gregory J. Boss, Saginaw, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 15/805,564

(22) Filed: Nov. 7, 2017

(65) Prior Publication Data

US 2019/0138964 A1  May 9, 2019

(51) Int. Cl.
*G06Q 10/00* (2012.01)
*G06Q 10/06* (2012.01)
*G06F 16/35* (2019.01)
*G06N 5/02* (2006.01)

(52) U.S. Cl.
CPC ..... *G06Q 10/06315* (2013.01); *G06F 16/353* (2019.01); *G06N 5/02* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 7,681,195 B2 | 3/2010 | Boss et al. | |
| 8,762,987 B1 * | 6/2014 | Satish | G06F 8/61 |
| | | | 717/174 |
| 10,067,038 B2 * | 9/2018 | Hou | F04B 51/00 |
| 10,817,848 B2 * | 10/2020 | Jones | G06Q 10/20 |
| 2010/0162036 A1 | 6/2010 | Linden et al. | |

(Continued)

OTHER PUBLICATIONS

Rhee, Ed, 5 Apps for Benchmarking your Android Device, Aug. 9, 2011, C/Net, https://www.cnet.com/how-to/5-apps-for-benchmarking-your-android-device/, p. 1-5.*

(Continued)

*Primary Examiner* — Joseph M Waesco
(74) *Attorney, Agent, or Firm* — Brian Restauro; Andrew D. Wright; Roberts Calderon Safran & Cole, P.C.

(57) ABSTRACT

Approaches for device refresh determinations utilizing cognitive, machine learning, and predictive techniques are provided. A computer-implemented method includes: obtaining, by a computer device, structured data associated with at least one user device; obtaining, by the computer device, unstructured data associated with the at least one user device; classifying, by the computer device, the unstructured data into categories; determining, by the computer device, a device health score for the at least one user device based on the structured data and the classified unstructured data; and generating, by the computer device, a user interface that displays the device health score.

20 Claims, 8 Drawing Sheets

(56) References Cited

U.S. PATENT DOCUMENTS

| | | | | |
|---|---|---|---|---|
| 2014/0358601 | A1* | 12/2014 | Smiley | G06Q 10/0635 |
| | | | | 705/7.11 |
| 2015/0242910 | A1 | 8/2015 | Ramasubramanian et al. | |
| 2016/0153806 | A1* | 6/2016 | Ciasulli | H04L 45/22 |
| | | | | 702/184 |
| 2016/0154690 | A1* | 6/2016 | Horrell | G06F 11/0709 |
| | | | | 714/57 |
| 2017/0006135 | A1* | 1/2017 | Siebel | G06N 5/003 |
| 2017/0212653 | A1* | 7/2017 | Kanojia | H04L 41/0806 |
| 2017/0214574 | A1* | 7/2017 | Kanojia | H04W 4/80 |
| 2017/0214577 | A1* | 7/2017 | Kanojia | G06F 3/167 |
| 2017/0295077 | A1* | 10/2017 | Dyszynski | H04L 67/18 |
| 2017/0353352 | A1* | 12/2017 | Nicholas | H04L 41/0803 |
| 2017/0353353 | A1* | 12/2017 | Nicholas | H04L 41/0803 |
| 2018/0113442 | A1* | 4/2018 | Nixon | G05B 19/4184 |
| 2018/0183740 | A1* | 6/2018 | Werdell | H04W 4/14 |
| 2018/0191867 | A1* | 7/2018 | Siebel | H04L 67/322 |
| 2018/0295465 | A1* | 10/2018 | Generes, Jr. | H04L 41/5025 |
| 2018/0349027 | A1* | 12/2018 | Mooney | G16H 50/30 |
| 2019/0086911 | A1* | 3/2019 | Xin | G05B 23/0251 |

OTHER PUBLICATIONS

Mell et al., "The NIST Definition of Cloud Computing", NIST, Special Publication 800-145, Sep. 2011, 7 pages.

Morita, Satterfield Jr. and Boss, "IBM MMS Expense Management with Watson," presented at BMO Harris Meeting, Sep. 20, 2017, https://ibm.ent.box.com/s/bn7rh0u16t8nhw8fom4rumypbmp14x4m, 6 pages.

Morita, Satterfield Jr. and Boss, "IBM Expense Management with Watson," presented at Microsoft Ignite Sep. 25-29 2017, 1 page. Video at https://ibm.ent.box.com/s/9oife5rc0gcjzfk5rz39uzbx1ktpk92s.

* cited by examiner

DETERMINING OPTIMAL DEVICE REFRESH CYCLES AND DEVICE REPAIRS THROUGH COGNITIVE ANALYSIS OF UNSTRUCTURED DATA AND DEVICE HEALTH SCORES

STATEMENT REGARDING PRIOR DISCLOSURES BY THE INVENTORS

The following grace period disclosures by the inventors are submitted under 35 U.S.C. § 102(b)(1)(A): "IBM MMS Expense Management with Watson," presented at BMO Harris Meeting, Sep. 20, 2017, https://ibm.ent.box.com/s/bn7rh0u16t8nhw8fom4rumypbmp14x4m, 6 pages.; and "IBM Expense Management with Watson," presented at Microsoft Ignite Sep. 25-29 2017, 1 page. Video at https://ibm.ent.box.com/s/9oife5rc0gcjzfk5rz39uzbx1ktpk92s.

BACKGROUND

The present invention generally relates to computer device management and, more particularly, to determining optimal device refresh cycles and device repairs through cognitive analysis of unstructured data and device health scores.

It is commonplace for a business organization (e.g., an enterprise) to utilize numerous computer devices in day-to-day operations. For example, a single retail enterprise may utilize thousands of computerized point-of-sale terminals and thousands of desktop and laptop computers dispersed throughout plural locations such as retail stores, offices, and warehouses. It is also commonplace for a business organization to replace its computer devices as the devices age. For example, computer devices are routinely replaced on a time-based cycle. At the time of replacement (e.g., usually 2-3 years), the computer devices are typically replaced whether they need to be or not.

Some computer devices of the enterprise may still be functioning well at the end of their time-based lifecycle, such that they do not need to be replaced. On the other hand, some computer devices of the enterprise may degrade in functionality to the point where it impacts device performance, affecting user productivity and satisfaction, prior to the time-based lifecycle replacement date.

SUMMARY

In a first aspect of the invention, there is a computer-implemented method comprising: obtaining, by a computer device, structured data associated with at least one user device; obtaining, by the computer device, unstructured data associated with the at least one user device; classifying, by the computer device, the unstructured data into categories; determining, by the computer device, a device health score for the at least one user device based on the structured data and the classified unstructured data; and generating, by the computer device, a user interface that displays the device health score. The structured data may comprise device management data and or device monitoring data. The unstructured data may comprise free-form text included in tickets from a service desk. The classifying the unstructured data may comprise applying at least one of natural language understanding (NLU), semantic text analysis, and machine learning techniques to analyze the unstructured data. In this manner, implementations of the invention advantageously facilitate optimal device refresh decisions by analyzing unstructured data from service desk (e.g., help desk) tickets.

In another aspect of the invention, there is a computer program product for device refresh determination. The computer program product comprises a computer readable storage medium having program instructions embodied therewith, the program instructions being executable by a computing device to cause the computing device to: receive, from at least one structure data source, structured data associated with a plurality of user devices; receive, from at least one unstructured data source, unstructured data associated with the plurality of user devices; classify the unstructured data into categories included in a scoring function; normalize the structured data and the classified unstructured data; determine, using the scoring function, a respective device health score for each of the plurality of user devices based on the normalized structured data and the normalized classified unstructured data; and generate a user interface that displays each of the plurality of user devices ranked according to the respective device health scores. The unstructured data may comprise at least one from the group consisting of: free-form text included in tickets from a service desk; social media data; repair depot data; and audio data. The classifying the unstructured data may comprise applying at least one from the group consisting of: natural language understanding (NLU), semantic text analysis, and machine learning techniques. In this manner, implementations of the invention advantageously facilitate optimal device refresh decisions by analyzing unstructured data from service desk (e.g., help desk) tickets.

In another aspect of the invention, there is a refresh system comprising: a refresh server comprising a processing unit, a computer readable memory, a computer readable storage medium. The refresh server comprises a tiered architecture including: a data layer configured to store: (i) structured data obtained from at least one structured data source, the structured data being associated with a plurality of user devices; and (ii) unstructured data obtained from at least one unstructured data source, the unstructured data being associated with the plurality of user devices; a business layer configured to: (i) obtain a classification of the unstructured data into categories included in a scoring function; (ii) normalize the structured data and the classified unstructured data; and (iii) determine, using the scoring function, a respective device health score for each of the plurality of user devices based on the normalized structured data and the normalized classified unstructured data; and a presentation layer configured to generate a user interface that displays: (i) each of the plurality of user devices ranked according to the respective device health scores; (ii) respective counts of the plurality of user devices in each of a plurality of predefined health status categories; and at least one refresh recommendation. The unstructured data may comprise at least one from the group consisting of: free-form text included in tickets from a service desk; social media data; repair depot data; and audio data. The classifying the unstructured data may comprise applying at least one from the group consisting of: natural language understanding (NLU), semantic text analysis, and machine learning techniques. In this manner, implementations of the invention advantageously facilitate optimal device refresh decisions by analyzing unstructured data from service desk (e.g., help desk) tickets.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
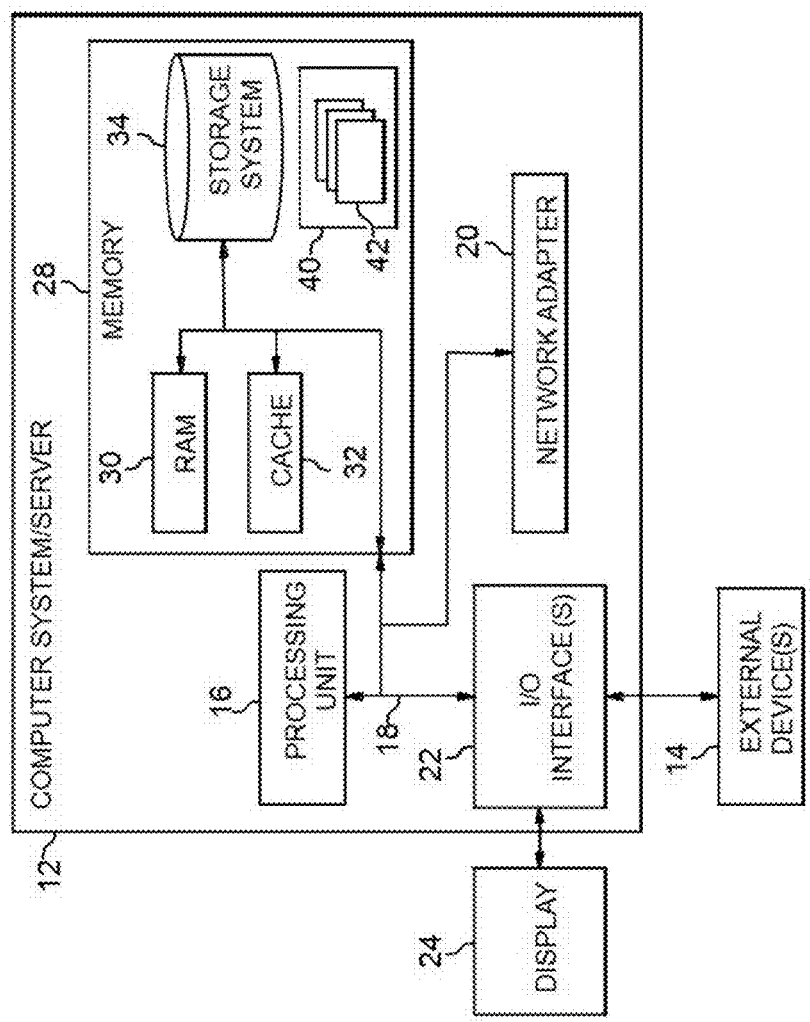
FIG. 1 depicts a cloud computing node according to an embodiment of the present invention.

The present invention generally relates to computer device management and, more particularly, to determining optimal device refresh cycles and device repairs through cognitive analysis of unstructured data and device health scores. Aspects of the invention are directed to a system that utilizes cognitive, machine learning, and predictive techniques to generate a device health score for a computer device based on structured data and unstructured data, and that recommends when the computer device should be replaced. The collection and utilization of both structured data and unstructured data provides insights into the device's hardware performance and degradation, the user's persona, and support tickets related to the computer device. In embodiments, a system is configured to determine an optimal time to refresh (e.g., replace) a computer device, which may be ahead of or behind the traditional time-based lifecycle replacement date. In this manner, implementations of the invention provide a novel approach to determining a device refresh recommendation.

Conventional asset management systems typically involve replacing computer devices based on time alone, i.e., based on the age of any given computer device in service. However not all devices degrade at the same rate and not all devices perform the same roles. For example, some computer devices are lightly used for relatively simple computing such as email and web browsing, while other computer devices are heavily utilized for complex computing such as used development, engineering, graphical design, etc. As such, a one-size-fits-all, time-based lifecycle is inefficient and does not account for the true health of any particular computer device. Another drawback with the one-size-fits-all, time-based lifecycle approach is that financial analysis and decisions are often made at a high level and point-in-time without considering the actual device operational performance and history.

In contrast to conventional approaches, aspects of the invention are directed to a solution that collects data from various sources related to each respective one of a plurality of deployed computer devices to provide optimized recommendations on when the respective computer devices should be replaced. In embodiments, a device health score is used to provide weighting across a number of defined dimensions along with financial inputs for the priority and ranking of which devices to replace.

In embodiments, a refresh system according to aspects of the invention utilizes a scoring function to determine a device health score for each one of a plurality of computer devices. In embodiments, the scoring function is based on parameters that correspond to categories of structured data that is obtained from at least one structured data source. In embodiments, the refresh system also obtains unstructured data from at least one unstructured data source, and analyzes the unstructured data using cognitive computing techniques to classify the unstructured data into one or more of the categories of the scoring function. In this manner, the scoring function that is used to determine a device health score for a respective computer device is based on both structured data and unstructured data. In a preferred embodiment, the refresh system according to aspects of the invention normalizes each data item that is obtained and used in the scoring function, e.g., by determining a normalized score of 0-100 for each data item.

In embodiments, the scoring function is customizable to meet the needs of an end user. For example, an end user (e.g., an enterprise administrator) may utilize a user interface of the refresh system to specify (e.g., select and de-select) which parameters are included in the scoring function. Additionally, the end user may utilize the user interface of the refresh system to assign weighting values to one or more of the parameters included in the scoring function, such that certain parameters are weighted higher (e.g., more important) than others in the scoring function. In this manner, implementations of the invention permit each end user to uniquely configure the refresh system.

In embodiments, the refresh system according to aspects of the invention displays the determined device health score for a computer device in a user interface. In embodiments, the refresh system categorizes the computer device into one of plural pre-defined health status categories (e.g., excellent, good, declining, failing) based on comparing the device health score to threshold values. The refresh system may be configured to display, via the user interface, details associated with a single computer device and its determined device health score. The refresh system may also be configured to simultaneously display plural determined device health scores for plural computer devices in a single user interface. The user interface may list the plural computer devices ranked according to the respective device health scores. The user interface may also display a count of how many of the plural computer devices are included in each of the pre-defined health status categories (e.g., excellent, good, declining, failing). In this manner, the refresh system according to aspects of the invention may be used by an end user (e.g., an enterprise administrator) to make informed decisions about which computer devices to replace ahead of others.

The following three use cases are provided as examples that illustrate various aspects of the present invention. Implementations of the invention are not limited to the aspects described in these three use cases, and other aspects will become apparent from the description that follows.

In the first exemplary use case, a device health score that is unique to a computer device is utilized to accelerate a refresh time from a nominal time-based refresh date. In this example, Tom is an app developer that has just installed the latest software development kit (SDK) on his enterprise computer device (e.g., a laptop computer). After only one year, his laptop computer is performing slowly to the extent that it is affecting his ability to perform his work tasks. Tom has called the enterprise IT service desk (e.g., help desk) seven times in last four months due to performance issues with the laptop computer. The refresh system according to aspects of the invention automatically collects structured data associated with Tom's laptop computer, the structured data including a baseline of the laptop computer and performance metadata associated with the laptop computer for the previous year. The refresh system according to aspects of the invention also automatically collects and analyzes unstructured data associated with Tom's laptop computer, the unstructured data including Tom's IT service desk ticket data for indications of performance and satisfaction issues. The refresh system according to aspects of the invention automatically calculates a device health score for Tom's laptop computer based on the structured data and the unstructured data. The device health score indicates that Tom's laptop computer is declining rapidly. Based on the determined device health score, the system automatically initiates a device replacement request on Tom's behalf 18 months ahead of the nominal refresh schedule for Tom's laptop computer.

In the second exemplary use case, a refresh time for a computer device is delayed from a nominal time-based refresh date, based on a device health score that is unique to the device. In this example, John is a sales rep working in the same enterprise (e.g., company) as Tom from the first exemplary use case. John has a mobile computing device that has been in use for two years. The nominal time-based refresh date for mobile computing devices of the type used by John is two years. The refresh system according to aspects of the invention automatically collects both structured data and unstructured data associated with John's mobile computing device, and automatically calculates a device health score for John's mobile computing device based on the structured data and the unstructured data. The device health score indicates that John's mobile computing device functioning within a defined threshold. Based on the determined device health score, the system automatically extends the refresh date for John's mobile computing device by an additional six months (e.g., to 30 months instead of the nominal 24 months).

In the third exemplary use case, the system according to aspects of the invention automatically provides a financial recommendation based on determined device health scores. In this example, Jane is an IT operations manager for a global transportation company that has purchased and deployed over 50,000 specialized hand held computer devices in the company's operations. The hand held computer devices were put into service over the course of several years. The refresh system according to aspects of the invention automatically collects both structured data and unstructured data associated with each respective one of the 50,000 computing devices, and automatically calculates a respective device health score for each one of the 50,000 computing devices based on the structured data and the unstructured data associated with each respective device. As the hand held computer devices are used and experience damage over time, the data from ongoing repairs is also included in the determining the device health score for a particular device. The refresh system according to aspects of the invention automatically makes recommendations to Jane that, based on replacement costs and warranty guarantees, it would be more cost effective to switch from the current hand held model based on TCO (Total Cost of Ownership) of the devices. Leasing and end of term buy back recommendations are also included in the recommendations made by the refresh system according to aspects of the invention.

As should be evident from these exemplary use cases and the description that follows, aspects of the invention are directed to a system and method to create a device health score using machine learning with structured data and unstructured data from various sources. Aspects of the invention are also directed to a system and method to analyze unstructured data from social, enterprise mobility management (EMM), and support ticket data to extract device related information related to the device health score. Aspects of the invention are also directed to a system and method to use the device health score to optimize device refresh cycles and repair/upgrade recommendations. Aspects of the invention are also directed to a system and method to analyze financial forecast data to optimize procurement options, such as lease, finance, purchase, internal budgeting, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
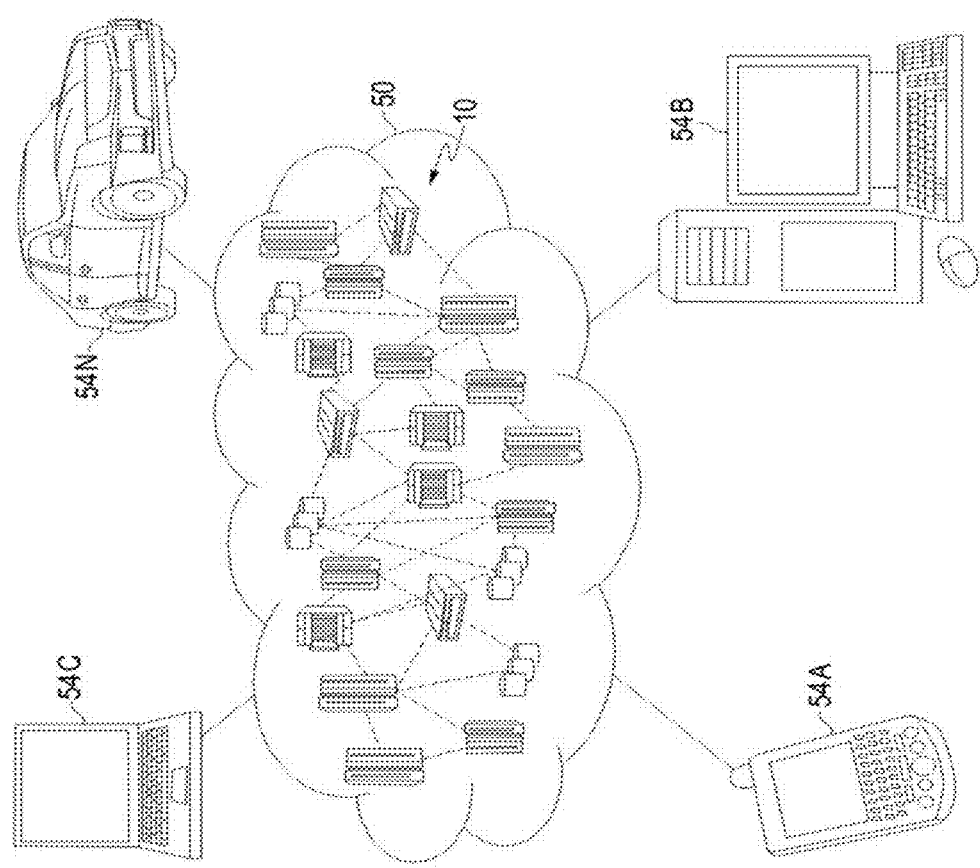
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
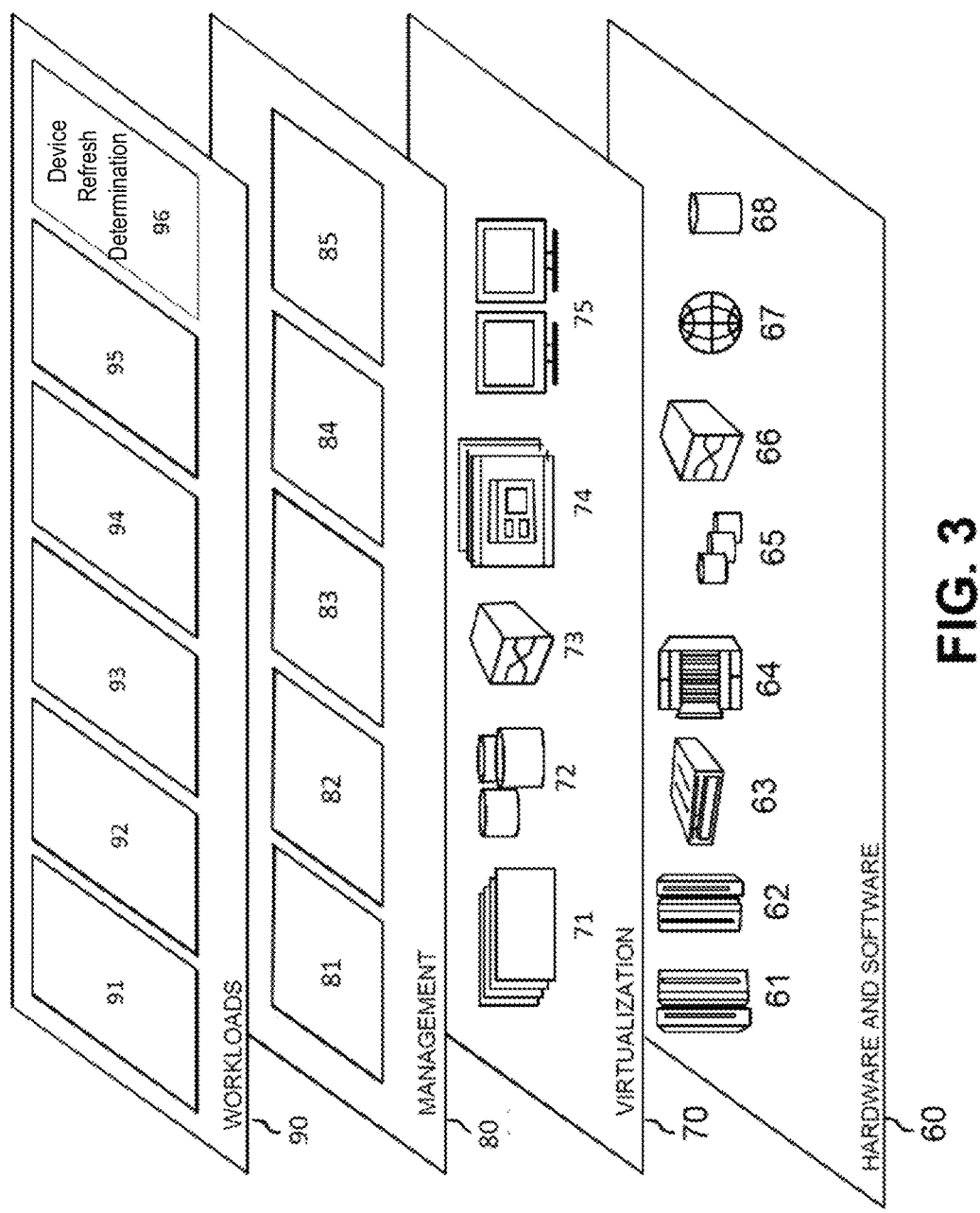
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device refresh determination 96.

In embodiments, the device refresh determination 96 includes: generating a device health score to determine readiness for replacement of a computer device; reading device data from device management tools; reading device data from device monitoring tools; gathering device-related incident tickets using cognitive analysis; gathering persona related data from client systems; applying weighting and priority settings data points to generate a device health score; gathering data and input from device repair depot; and providing periodic financial forecasts and cost optimization recommendations on purchased and leased devices.

Figure 4:
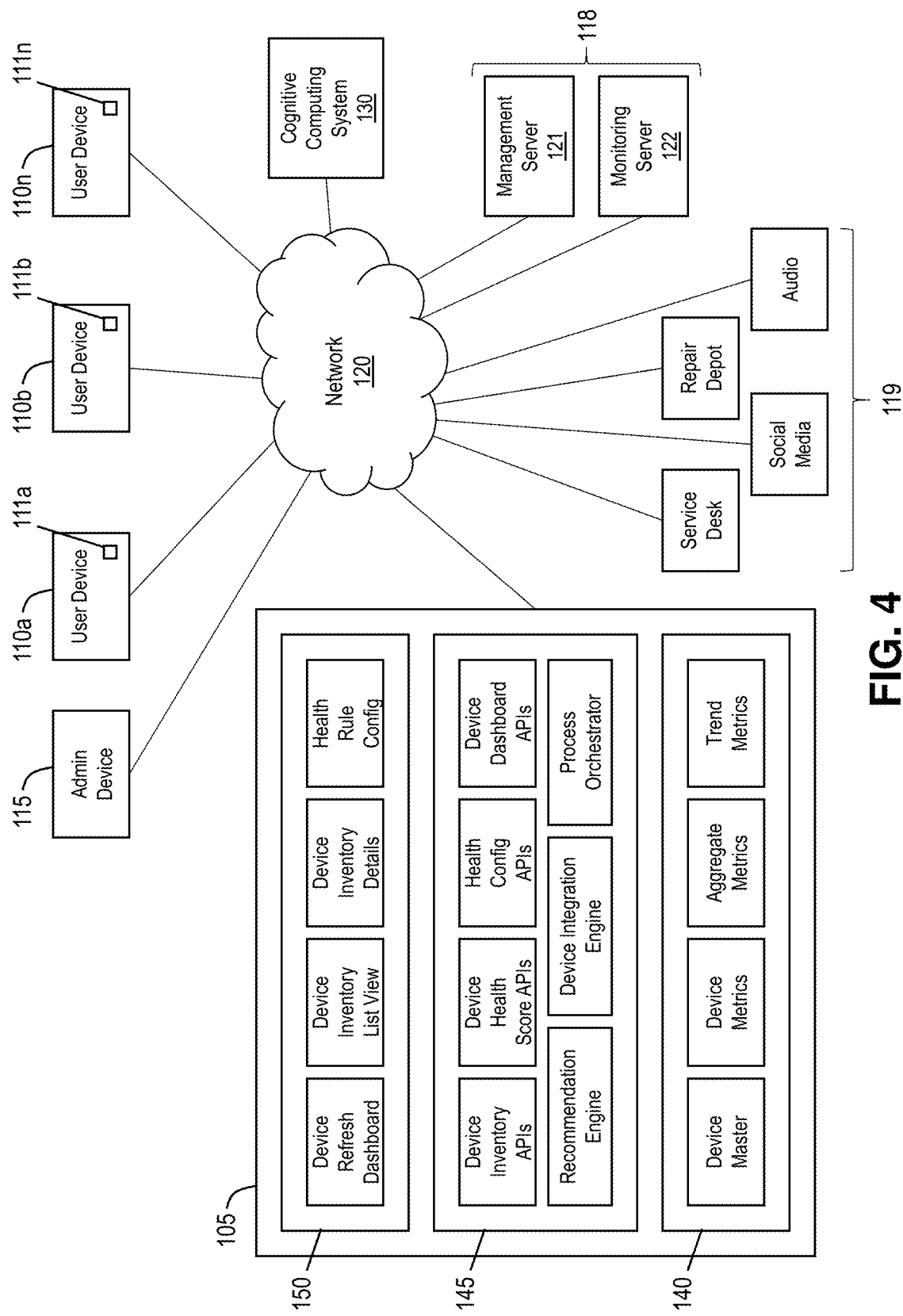
FIG. 4 shows a block diagram of an exemplary environment in accordance with aspects of the invention.

FIG. 4 shows a block diagram of an exemplary environment in accordance with aspects of the invention. In embodiments, the environment includes a refresh server 105, a plurality of user devices 110a-n, and an admin device 115, at least one structured data source 118, and at least one unstructured data source 119, all operatively connected to a network 120. The refresh server 105 may comprise one or more computer servers similar to computer system/server 12 described with respect to FIG. 1. The refresh server 105 may comprise one or more modules (e.g., program modules 42 as described with respect to FIG. 1) that are configured to carry out one or more processes in accordance with aspects of the invention. In embodiments, the refresh server 105 is configured, via the modules, to perform the device refresh determination 96 functionality described with respect to FIG. 3.

The network 120 may be any communications network or group of communications networks, including but not limited to a local area network (LAN), a wide area network (WAN), and the Internet. In an embodiment, the network 120 is part of a cloud computing environment such as cloud computing environment 50 described with respect to FIG. 2, and the refresh server 105 comprises one or more nodes 10 of the cloud computing environment 50. In the cloud-based implementation, the refresh server 105 is configured as a cloud service provider that provides cloud-based services to the admin device 115 based on data associated with the user devices 110a-n.

In accordance with aspects of the invention, each user device 110a-n is a respective computer device that may include, without limitation, smartphones, tablet computers, laptop computers, desktop computers, personal digital assistants, point-of-sale terminals, inventory scanners, sensors, IoT devices, etc. Each user device 110a-n may have components similar to those in computer system/server 12 described with respect to FIG. 1, and may have additional components not shown in FIG. 1. Each user device 110a-n may store and run one or more software agents 111a-n that communicate, via the network 120, with the at least one structured data source 118.

In embodiments, the at least one structured data source 118 comprises a device management server 121 and a device monitoring server 122. The at least one structured data source 118 is not limited to these examples, and instead may comprise any number and type of data sources that collect and store structured data about the user devices 110a-n. As used herein structured data refers to data that is arranged and stored in predefined categories (as opposed to unstructured data which may include, for example, free-form text).

The device management server 121 may comprise one or more servers that collect and store structured management data about each user device 110a-n. For example, the device management server 121 may comprise an enterprise mobility management (EMM) server that is configured to collect structured management data from each user device 1101-n. Examples of such structured management data may include, but are not limited to: hard drive capacity, hard drive speed, days old, device ID, device name, device manufacturer, IMEI, device model number, device enrollment date/time, memory total, storage total, memory available, storage available, charge status, etc.

Still referring to FIG. 4, the device monitoring server 122 may comprise one or more servers that collect and store structured monitoring data about each user device 110a-n. For example, the device monitoring server 122 may comprise a server running SysTrack® software, or similar monitoring software, that collects data related to application usage, application performance, application faults, application latency, resource utilization, hard drive usage percent, number of hard drive errors, average memory usage, average CPU usage, hours powered on, CPU utilization, memory utilization, network bandwidth consumed per application, errors logged in the operating system, power average, time since the specified system's installation, clock speed, memory type, OS install date, etc.

In embodiments, the refresh server 105 is configured to communicate with the at least one structured data source 118 to obtain structured data that is utilized in the manner described herein. For example, the refresh server 105 may use application program interface (API) calls to obtain the data from the device management server 121 and the device monitoring server 122. In particular, the refresh server 105 may use a REST API call unique to the device management server 121 to obtain data from the device management server 121, and the refresh server 105 may use a REST API call unique to the device monitoring server 122 to obtain data from the device monitoring server 122.

With continued reference to FIG. 4, according to aspects of the invention the refresh server 105 is configured to obtain unstructured data about the user devices 110a-n from at least one unstructured data source 119. In embodiments, the at least one unstructured data source 119 comprises service desk (e.g., help desk) ticket data. For example, the at least one unstructured data source 119 may comprise a server and/or a database that stores data related to service desk tickets associated with the user devices 110a-n. The service desk ticket data may include unstructured data (e.g., free-form text) describing problems reported by users of the user devices 110a-n. The issues (e.g., problems) described in the service desk ticket data may include, but are not limited to: hardware issues (e.g., general device issues, battery issues, memory issues, keypad issues, performance issues, hard drive issues, etc.), software issues (e.g., operating system, business applications, communication applications, etc.), and non-device issues (e.g., accessory issues, etc.). The refresh server 105 may use API calls, for example, to communicate with the at least one unstructured data source 119 to obtain the unstructured data about the user devices 110a-n.

The at least one unstructured data source 119 is not limited to service desk ticket data, and instead may include any number of different types of unstructured data. For example, the at least one unstructured data source 119 may comprise social media data. In embodiments, the refresh server 105 is configured to obtain unstructured data (e.g., free-form text) from one or more social media servers associated with (e.g., used by) the user devices 110a-n. In another example, the at least one unstructured data source 119 may comprise device repair depot data. In another example, the at least one unstructured data source 119 may comprise audio data captured at enterprise functions, such as meetings. The source of the unstructured data is not limiting, and implementations of the invention may use unstructured data from any source, so long as the unstructured data is capable of being analyzed by a cognitive computing system as described herein.

According to aspects of the invention, the refresh server 105 is configured to utilize a cognitive computing system 130 to analyze the unstructured data that is obtained from the at least one unstructured data source 119. In embodiments, the cognitive computing system 130 comprises one or more servers that are programmed to apply at least one of natural language understanding (NLU), semantic text analysis, and machine learning techniques to analyze the unstructured data to extract meaning from the unstructured data. As described herein, the extracted meaning is in a form that is usable by the refresh server 105 in determining a device health score of the user devices 110a-n. For example, in embodiments the cognitive computing system 130 applies at least one of NLU, semantic text analysis, and machine learning techniques to classify the unstructured data into one or more of the predefined categories of the structured data. The refresh server 105 may use API calls, for example, to communicate with the cognitive computing system 130, e.g., to provide the unstructured data to the cognitive computing system 130 and receive the results from the cognitive computing system 130.

With continued reference to FIG. 4, in accordance with aspects of the invention, the refresh server 105 comprises a software solution that leverages cloud and hybrid architecture that can deliver a device recommendation via web protocols and mobile platforms. In embodiments, the refresh server 105 comprises a data layer 140, a business layer 145, and a presentation layer 150. Each of the layers 140, 145, 150 may comprise one or more program modules such as program modules 42 described with respect to FIG. 1.

In aspects, the data layer 140 is configured to store and rationalize collected data for input into the device health scores for the user devices 110a-n. The data layer 140 may comprise data storage (e.g., a database) that stores the data obtained from the structured data source 118 and the unstructured data source 119 regarding each of the user devices 110a-n. The data layer 140 may include, without limitation, at least one of: a device master module, a device metrics module, an aggregate metrics module, and a trend metrics module.

In aspects, the business layer 145 is configured to provide logic for the calculation of the device health score based on a weighting set by a client profile input. The business layer 145 may comprise one or more program modules that are configured to determine a respective device health score for each of the user devices 110a-n based on the structured data and unstructured data (obtained from the data layer 140)

associated with each of the user devices 110a-n. The business layer 145 may comprise one or more program modules that are configured to determine a device refresh recommendation for a respective one of the user devices 110a-n based on the determined device health score for respective one of the user devices 110a-n. In this manner, the business layer 145 may be programmed with: logic that defines a scoring function (e.g., comprising one or more algorithms) that is used to determine a device health score based on the structured data and unstructured data; logic that defines one or more algorithms and or rules that are used to generate recommendations for device refresh based on the determined device health scores; and logic that defines one or more algorithms and or rules that are used to provide periodic financial forecasts and cost optimization recommendations on purchased and leased devices. The business layer 145 may include, without limitation, at least one of: device inventory APIs, device health score APIs, health configuration APIs, device dashboard APIs, a recommendation engine, a data integration engine, and a process orchestrator. The various program modules contained in the business layer 145 may be implemented as Java application modules, for example.

As described herein, in embodiments the business layer 145 is configured to determine a device health score for each of the user devices 110a-n based on a number of sub-components that represents the different important aspects of a device's health. The device health score sub-components can include but are not limited to: device data (e.g., structured data) including hardware score, performance score, age score, and persona match score; and service desk ticket data (e.g., unstructured data) including hardware issues (e.g., general device issues, battery issues, memory issues, keypad issues, performance issues, hard drive issues, etc.), software issues (e.g., operating system, business applications, communication applications, etc.), and non-device issues (e.g., accessory issues, etc.). The business layer 145 may be configured to take various sources of data from devices, operational metrics, and unstructured data, plug the data into these sub-components, and determine a device health score using a scoring function. The components and/or sub-components may correspond to parameters of the scoring function as described herein. In embodiments, a weighting may be configured for each component, and this weighting is utilized by the scoring function into the calculation of the sub-component and overall device health score. The device health scores for plural user devices 110a-n are then used in conjunction with logical sorting and processing of devices under management to provide a recommendation and prioritized list devices to be refreshed.

In embodiments, the business layer 145 is configured such that each user device 110a-c starts with a device health score of 100%, and this device health score diminishes over time with usage, events, etc. Moreover, the business layer 145 is configured to: provide recommendations of when to initiate device refreshes; utilize predictive analytics to identify those devices most likely to experience failure based on hardware characteristics where data is available; utilize predictive analytics to identify those devices most likely to experience issues with software failures where a new device would resolve; avoid disruption to critical business functions (when data is available); identify those devices that have security gaps and issues and should be replaced (e.g., tied to operating systems and inability to upgrade, etc.); and identify those devices that have compliance gaps & issues (e.g., lack of encryption on device due to age, OS, etc.)

In aspects, the presentation layer 150 is configured to present a device refresh recommendation for one or more of the user devices 110a-n in a web dashboard that can be delivered via web protocols and/or mobile delivery platforms. In embodiments, the presentation layer 150 is configured to visually present data generated by the business layer 140 in a user interface that is presented on the admin device 115. Examples of such user interfaces are provided at FIGS. 5 and 6. The presentation layer 150 may include, without limitation, a device refresh dashboard module, a device inventory list view module, a device inventory details module, and a health rule configuration module. The presentation layer 150 may be implemented using Node.js programming, for example.

As depicted in FIG. 4, the admin device 115 may communicate with the refresh server 105 via the network 120, such as via HTTPS (e.g., a web browser). In this manner, a user of the admin device 115 may provide input via the admin device 115 to configure aspects of the refresh system. For example, an end user (e.g., an enterprise administrator) may utilize a user interface presented at the admin device 115 to specify (e.g., select and de-select) which parameters (e.g., categories of structured data) are included in the scoring function that is used by the business layer 145 to determine device health scores for the user devices 110a-n. Additionally, the end user may utilize the user interface presented at the admin device 115 to assign weighting values to one or more of the parameters included in the scoring function, such that certain parameters are weighted higher (e.g., more important) than others in the scoring function. Additionally, the end user may utilize the user interface presented at the admin device 115 to configure threshold values that are utilized by the business layer 145 to categorize the user devices 110a-n into one of plural pre-defined health statuses (e.g., excellent, good, declining, failing) based on their respective device health scores. In this manner, implementations of the invention permit each end user to uniquely configure the refresh system.

Figure 5:
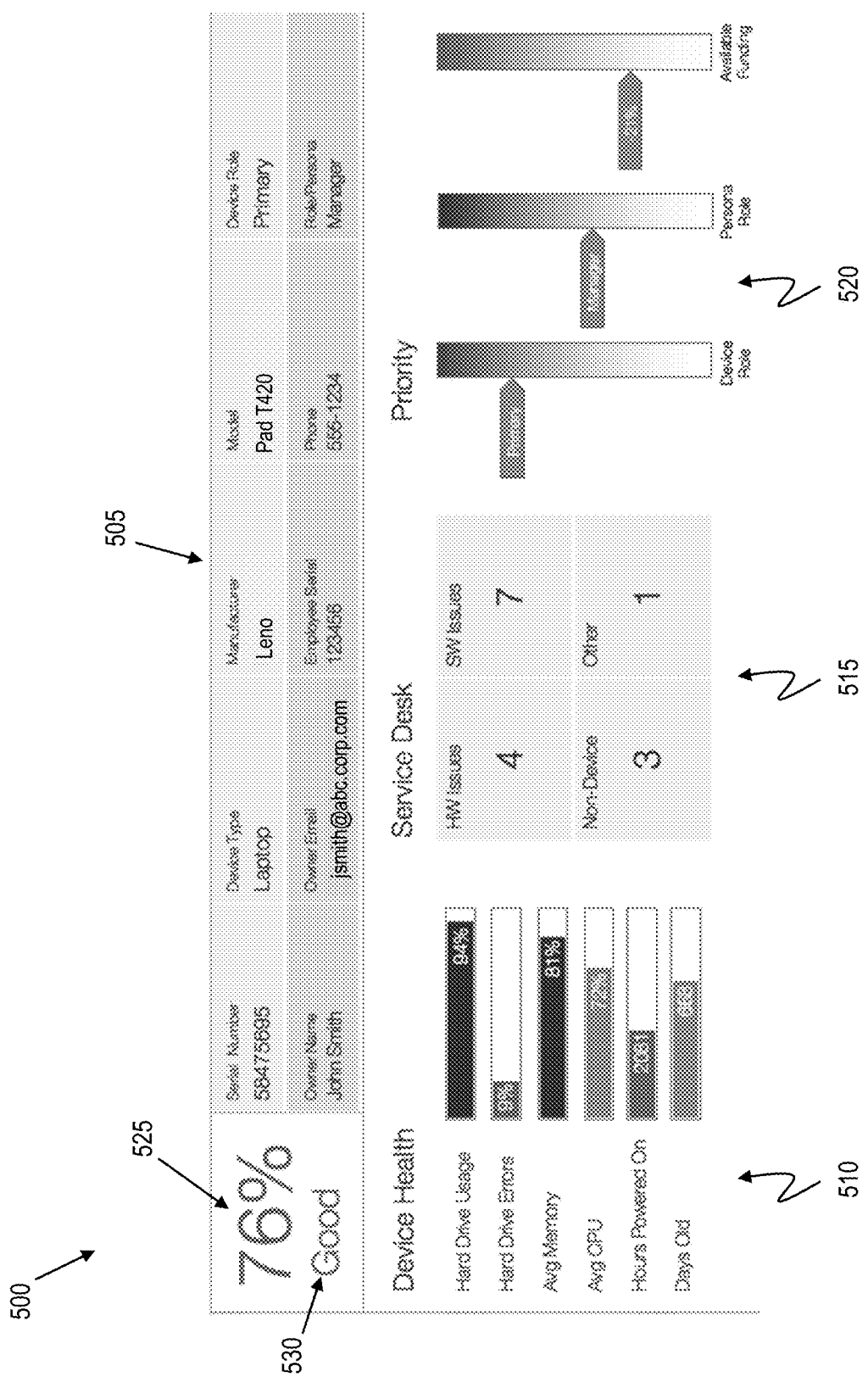
FIG. 5 shows an exemplary user interface in accordance with aspects of the invention.
Figure 6:
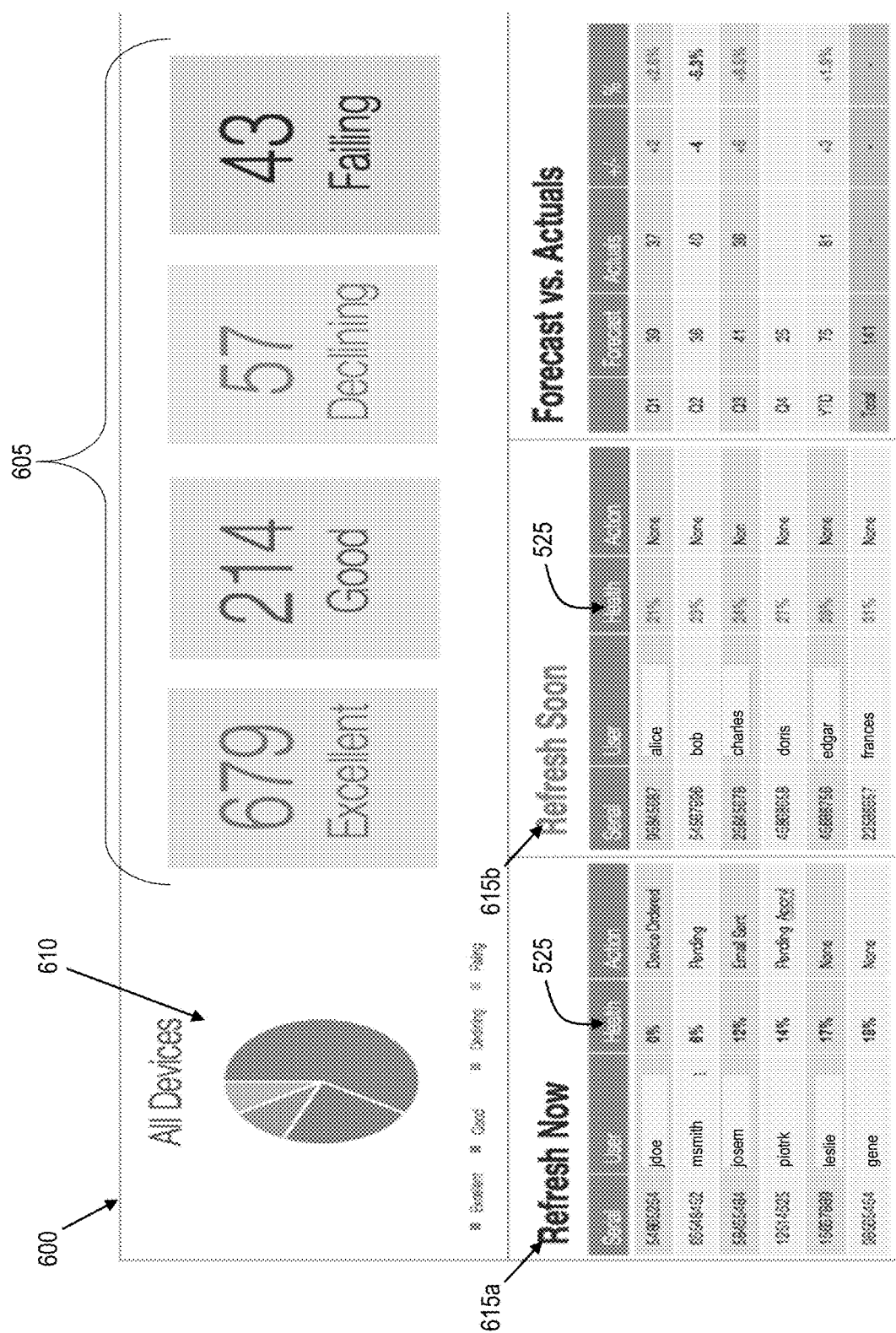
FIG. 6 shows an exemplary user interface in accordance with aspects of the invention.

According to aspects of the invention, the refresh server 105 provides data to the admin device 115 in the form of user interfaces, such as those shown in FIGS. 5 and 6, which are described in greater detail herein. The refresh server 105 may be configured to generate a user interface that displays details associated with a single one of the user devices 110a-n and its determined device health score, e.g., as depicted in FIG. 5. The refresh server 105 may be configured to generate a user interface that simultaneously displays plural determined device health scores for plural user devices 110a-n, e.g., as depicted in FIG. 6. The user interface may list the plural user devices 110a-n ranked according to the respective device health scores, e.g., as depicted in FIG. 6. The user interface may also display a count of how many of the plural user devices 110a-n are included in each of the pre-defined health statuses (e.g., excellent, good, declining, failing), e.g., as depicted in FIG. 6. In this manner, the refresh server 105 according to aspects of the invention may be leveraged by an end user (e.g., an enterprise administrator) to make informed decisions about which of the user devices 110a-n to refresh (e.g., replace) ahead of others.

FIG. 5 shows an exemplary user interface 500 in accordance with aspects of the invention. In embodiments, the user interface 500 is generated by the refresh server 105 and displayed at the admin device 115 as described with respect to the environment of FIG. 4. In embodiments, the user interface 500 includes data about a particular one of the user devices 110a-n, the data including: device identification data 505 (e.g., which may be based on structured data obtained from the device management server 121); device health data 510 (e.g., which may be based on structured data obtained from the device monitoring server 122); service desk data 515 (e.g., which may be based on unstructured data obtained from the service desk ticket data that has been classified by the cognitive computing system 130); priority data 520 (e.g., which may be defined by via the admin device 115 regarding this particular user device and/or the user of this particular user device); a device health score 525 (e.g., as determined by the business layer 145 of the refresh server 105); and an indication of a health status category 530 (e.g., as determined by the business layer 145 of the refresh server 105).

Still referring to FIG. 5, in accordance with aspects of the invention, the refresh server 105 determines the device health score 525 in the manner described herein, e.g., by obtaining structured data and unstructured data, classifying the unstructured data, normalizing each component of the structured data and the classified unstructured data, and using a scoring function to determine the device health score based on the normalized data. As described herein, the scoring function may take into account user-defined weightings of the data and/or profile inputs that define, for example, a device role for the device and a persona role for a user of the device. For example, the scoring function may include priority data such as a device role parameter and a persona role parameter, and values for these parameters may be defined by the admin for each of the user devices 110*a-n*. The device role parameter may be a measure of criticality of the various user devices 110*a-n*. The persona role parameter may be a measure of importance of the user within the enterprise, e.g., a full time designer versus a part time summer intern. In accordance with aspects of the invention, the refresh server 105 determines the device health status category 530 in the manner described herein, e.g., by comparing the determined device health score to threshold values that define the (e.g., 100% to 80%=excellent; 79% to 50%=good; 49% to 20%=declining; and 19% to 0%=failing).

FIG. 6 shows an exemplary user interface 600 in accordance with aspects of the invention. In embodiments, the user interface 600 is generated by the refresh server 105 and displayed at the admin device 115 as described with respect to the environment of FIG. 4. In contrast to the user interface 500 of FIG. 5, which shows data about a single one of the user devices 110*a-n*, the user interface 600 of FIG. 6 shows data about all of the user devices 110*a-n*. In this example, the number "n" of user devices 110*a-n* equals 993, and the refresh server 105 has determined a unique device health score for each of the user devices 110*a-n*. The refresh server 105 has also categorized each of the user devices 110*a-n* into one of the predefined health status categories (e.g., excellent, good, declining, failing) by comparing the device health score for each device to the thresholds that define the categories.

In embodiments, the user interface 600 displays the results of the categorizing each of the user devices 110*a-n* into one of the health status categories. For example, the user interface 600 may include an area 605 that shows numeric values (e.g., counts) of the number of user devices 110*a-n* in each of the respective health status categories (e.g., excellent, good, declining, failing). Additionally, or alternatively, the user interface 600 may include an area 610 that shows a graph representation of the relative counts of user devices 110*a-n* in each of the respective health status categories (e.g., excellent, good, declining, failing).

Still referring to FIG. 6, the user interface 600 may include one or more recommendation areas 615*a* and 615*b*.

As described with respect to FIG. 4, the refresh server 105 may automatically generate refresh recommendations for the user devices 110*a-n* based on the determined device health scores of the user devices 110*a-n*. For example, the refresh server 105 may be programmed with logic that defines recommendation rules, such as "refresh now all user devices categorized as failing" and "refresh soon all user devices categorized as declining." Accordingly, the user interface 600 may be configured to include a first recommendation area 615*a* that corresponds to the "refresh now" recommendation rule and a second recommendation area 615*b* that corresponds to the "refresh soon" recommendation rule. The user interface 600 may be configured such that the first recommendation area 615*a* displays all the user devices 110*a-n* that satisfy the "refresh now" recommendation rule, and the user devices may be displayed in this area 615*a* in a sorted (e.g., ranked) manner according to device health score 525. The user interface 600 may be configured such that the second recommendation area 615*b* displays all the user devices 110*a-n* that satisfy the "refresh soon" recommendation rule, and the user devices may be displayed in this area 615*b* in a sorted (e.g., ranked) manner according to device health score 525.

As described herein, the refresh server 105 is configured to permit a user to customize various aspects of the refresh system, including the threshold values that define the respective health status categories (e.g., excellent, good, declining, failing). Accordingly, an end user may cause the user interface 600 to change its display by changing one or more of the threshold values that define the respective health status categories. For example, a change in the threshold values from (e.g., 100% to 80%=excellent; 79% to 50%=good; 49% to 20%=declining; and 19% to 0%=failing) to (e.g., 100% to 80%=excellent; 79% to 50%=good; 49% to 30%=declining; and 29% to 0%=failing), would cause a change in the counts displayed at areas 605 and 610, and would also cause a change in the specific devices listed in each of areas 615*a* and 615*b*. The end user could also effect a change in the user interface 600 by adjusting other configurable aspects described herein, including which parameters are included in the scoring function and weights assigned to one or more parameters in the scoring function.

As illustrated in FIGS. 5 and 6, and as described herein, the refresh server 105 according to aspects of the invention is configured to use the determined device health scores to optimize device refresh cycles and repair/upgrade recommendations. In this manner, implementations of the invention provide recommendations on device refresh covering key aspects related to the management of devices. The recommendation can include a device inventory that provides the capability to load all types of devices into the solution for visibility into common key characteristics related to the device inventory. In embodiments, the device inventory includes at least one of: number of devices 110*a-n*; date each device 110*a-n* was purchased; device type for each device 110*a-n*; operating system for each device 110*a-n*; purchase price for each device 110*a-n*; warranty information for each device 110*a-n*; date put in service for each device 110*a-n*; and any additional information configured by the end user.

As illustrated in FIG. 6, implementations of the invention provide the end user (via the admin device 115) with the ability to adjust configurable aspects that are used as input into the device refresh health score and other aspects utilized to make recommendations of device refresh. As described herein, the configurable aspects may include at least one of: which parameters (e.g., components) are included in the scoring function; relative weights applied to the parameters (e.g., components) that are included in the scoring function; threshold values that define health status categories; and aspects of recommendation rules that utilize the device health score(s) and/or health status categories. As additionally illustrated in FIG. 6, implementations of the invention provide the end user (via the admin device 115) with an on-demand recommendation of which ones of the user devices 110a-n should be replaced in the organization, sorted by priority based on the inputs defined herein.

In further embodiments, the refresh server 105 according to aspects of the invention may be configured to analyze financial forecast data to optimize procurement options, such as lease, finance, purchase, internal budgeting, etc. The business layer 145 may be programmed with logic that is configured to analyze the impact of the determined device health scores against the potential financial impacts based on how the potential financial impacts mitigate the device health scores. In this manner, implementations of the invention may be leveraged by an enterprise to analyze effects of different hypothetical procurement options for computing devices of the enterprise, as well as make recommendations on a most-cost effective action that will optimize future spending on computing devices of the enterprise. A method according to this embodiment includes: analyzing the lifespan of the user devices 110a-n based on historical data; analyze repair costs of the user devices 110a-n based on repair data; analyze end of lease value of the user devices 110a-n; analyze purchase cost and replacement cost data associated with the user devices 110a-n; analyze unstructured data and device health scores to estimate remaining life span of the user devices 110a-n; and automatically generate financial recommendations related to spending on the user devices 110a-n.

Figure 7:
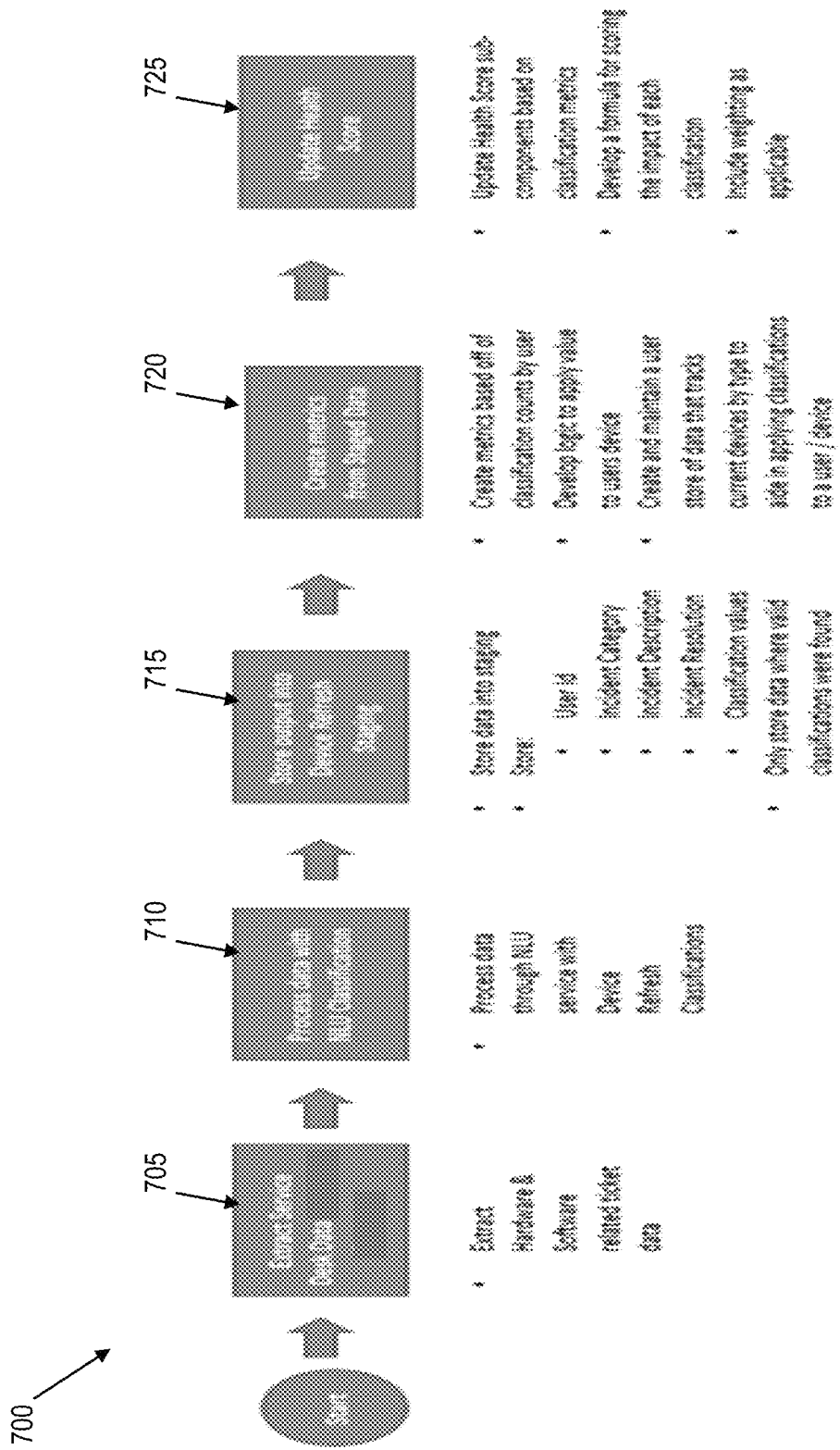
FIG. 7 shows a block diagram of steps of handling unstructured data in accordance with aspects of the invention.

FIG. 7 shows a block diagram 700 of steps of handling unstructured data in accordance with aspects of the invention. In embodiments, the refresh server 105 leverages several machine learning techniques (e.g., via the cognitive computing system 130) to process semi-structured and unstructured data to extract meaning and input into the device refresh process. In embodiments, semantic text analysis is used to create a mapping of service desk ticket data (e.g., free form problem and incident descriptions) to a device refresh taxonomy that is defined to group and analyze tickets submitted by users. The data is aggregated by categories and provides input into the individual user's experiences with devices. This data may be an additional input into the overall device health score of a device related to the service desk sub-components described herein. An additional area of machine learning is utilizing predictive analytics models to analyze device operational data to provide predictions and insight into how much "life" is left in devices, and this can be another input into one of the device health score sub-components.

A shown in FIG. 7, at step 705 the refresh server 105 extracts service desk data. This step may comprise, for example, obtaining unstructured data from the unstructured data source 119 as described with respect to FIG. 4. In embodiments, this step includes extracting hardware and software related ticket data.

At step 710, the refresh server 105 leverages the cognitive computing system 130 to process the data (from step 605) with NLU classification. This step may comprise, for example, the refresh server 105 performing an API call to the cognitive computing system 130, the cognitive computing system 130 analyzing the unstructured data, and the cognitive computing system 130 returning the results of the analysis to the refresh server 105 as described with respect to FIG. 4. In embodiments, the cognitive computing system 130 may process the data through an NLU service with device refresh classifications.

At step 715, the refresh server 105 stores the output (i.e., the results from the analysis of step 610) into a device refresh staging. This step may comprise, for example, the refresh server 105 saving the output in the data layer 140, as described with respect to FIG. 4. In embodiments, the output is stored according to: user ID; incident category; incident description; incident resolution; and classification values. In embodiments, the refresh server 105 only stores data where valid classifications are found, i.e., when the classified unstructured data matches a component or parameter used by the scoring function that is used to determine the device health score, as described with respect to FIG. 4.

At step 720, the refresh server 105 creates metrics from the staged data from step 615. This step may comprise, for example, the refresh server 105 creating metrics based on classification counts by the user, developing logic to apply value the user device, and creating and maintaining a user store of data that tracks current devices by type to aid in applying classifications to a user and/or a user device.

At step 725, the refresh server 105 updates the device health score. This step may comprise, for example, the refresh server 105 updating health score sub-components based on classification metrics, developing a formula for scoring the impact of each classification, and including weighting as applicable.

In embodiments, step 705 corresponds to collecting unstructured data related to user device issues, steps 710, 715, and 720 correspond to computing a weighted health score for each user device, and step 725 corresponds to applying client-specific weighting of each health score component. In this manner, implementations of the invention provide a method to analyze unstructured data from social, EMM, and support ticket data to extract device related information that is related to the health score.

Figure 8:
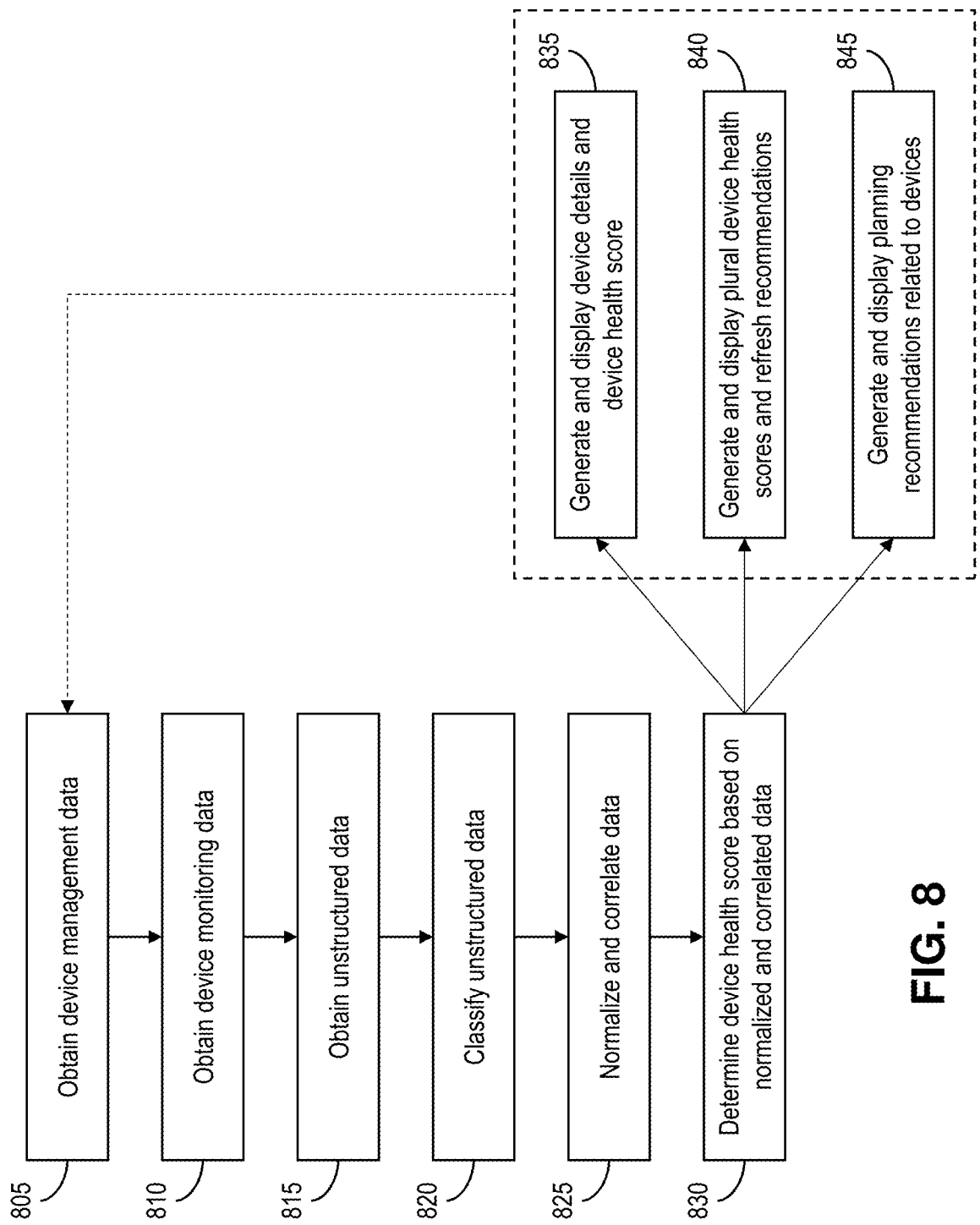
FIG. 8 shows a flowchart of a method in accordance with aspects of the invention.

FIG. 8 shows a flowchart of a method in accordance with aspects of the invention. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

At step 805, the refresh system obtains device management data about at least one computer device. In embodiments, step 805 comprises the refresh server 105 obtaining device management data about the user devices 110a-n from the device management server 121, e.g., as described with respect to FIG. 4.

At step 810, the refresh system obtains device monitoring data about the at least one computer device. In embodiments, step 810 comprises the refresh server 105 obtaining device monitoring data about the user devices 110a-n from the device monitoring server 122, e.g., as described with respect to FIG. 4.

At step 815, the refresh system obtains unstructured data about the at least one computer device. In embodiments, step 815 comprises the refresh server 105 obtaining unstructured data about the user devices 110a-n from the at least one unstructured data source 119, e.g., as described with respect to FIG. 4.

At step 820, the refresh system classifies the unstructured data from step 815. In embodiments, step 820 comprises the refresh server 105 sending the unstructured data from step 815 to the cognitive computing system 130, and receiving classification results from the cognitive computing system 130, e.g., as described with respect to FIG. 4. In embodiments, the cognitive computing system 130 may perform the classification in a manner similar to that described with respect to FIG. 7.

At step 825, the refresh system normalizes and correlates the data. In embodiments, the refresh server 105 normalizes each data item obtained at steps 805, 810, and 820, e.g., by assigning a 0-100 score to the data item, e.g., as described with respect to FIG. 4. In embodiments, the refresh server 105 also correlates the data items obtained at steps 805, 810, and 820 into components (or parameters) of the scoring function that is used to determine the device health score of the user devices.

At step 830, the refresh system determines a device health score for the at least one computer device based on the normalized and correlated data from step 830. In embodiments, the refresh server 105 determines a respective device health score for each one of the user devices 110*a-n* in the manner described with respect to FIG. 4.

At step 835, the refresh system generates and displays the device health score of the at least one computer device. In embodiments, the refresh server 105 generates a user interface 500, as described with respect to FIG. 5. In embodiments, the user interface 500 is configured to be displayed on the admin device 115 and includes a device health score of one of the user devices 110*a-n* as determined at step 830.

At step 840, the refresh system generates and displays plural device health scores and refresh recommendations. In embodiments, the refresh server 105 generates a user interface 600, as described with respect to FIG. 6. In embodiments, the user interface 600 is configured to be displayed on the admin device 115 and includes a device health score of plural ones of the user devices 110*a-n*.

At step 845, the refresh system generates and displays a financial planning recommendation for the at computer devices. In embodiments, as described with respect to FIGS. 4 and 6, the refresh server 105 may be configured to: analyze the lifespan of the user devices 110*a-n* based on historical data; analyze repair costs of the user devices 110*a-n* based on repair data; analyze end of lease value of the user devices 110*a-n*; analyze purchase cost and replacement cost data associated with the user devices 110*a-n*; analyze unstructured data and device health scores to estimate remaining life span of the user devices 110*a-n*; and generate and display financial recommendations related to spending on the user devices 110*a-n*.

Each of steps 835, 840, and 845 may be performed on-demand, e.g., based on receiving input from the admin device 115 requesting that one of the respective steps be performed. In embodiments, the method may be repeated any desired number of times as indicated by dashed arrow leading back to step 805.

In an exemplary implementation of the invention as described herein, there is a method comprising: collecting structured data from a first source related to a hardware device and unstructured data from a second source related to the hardware device; using one or more of the structured data and the unstructured data, determining a health of a first subcomponent of the hardware device and a health of a second subcomponent of the hardware device; and determining an overall health of the hardware device based on a weighting of the health of the first and second subcomponents. The method may further comprise initiating a device replacement request in response to a determination that the overall health of the hardware device is below a threshold. The determining the health of the first subcomponent may comprise using semantic text analysis to create a mapping of service desk (e.g., help-desk) ticket data included in the unstructured data to a taxonomy defining groups of service desk tickets. The determining the health of the first subcomponent may comprises predicting, using operational data of the first subcomponent, when the first subcomponent will no longer be operational. The method may further comprise ranking the hardware device and a second hardware device based on the overall health of the hardware device and an overall health of a second hardware device, and providing a recommendation for the hardware device and the second hardware device based on the ranking.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by a computer device, structured data associated with at least one user device, wherein the structured data is data that is arranged and stored in predefined categories, wherein the obtaining the structured data comprises: obtaining device management data from a device management server using an application program interface (API) call; and obtaining device monitoring data from a device monitoring server using another API call;
   obtaining, by the computer device, unstructured data associated with the at least one user device;
   classifying, by the computer device, the unstructured data into the predefined categories, wherein the classifying the unstructured data comprises analyzing the unstructured data using machine learning;

selectively storing, by the computing device, the classified unstructured data based on classifications of the classified unstructured data matching parameters of a scoring function;

normalizing, by the computing device, the structured data and the classified unstructured data;

generating, by the computing device, a user interface including options for customizing the scoring function;

receiving, by the computing device, user input customizing the scoring function;

automatically determining, by the computer device, a device health score for the at least one user device based on machine learning and the structured data and the classified unstructured data using the customized scoring function, wherein the automatically determining is performed on-demand based on user input received via the user interface; and causing the display, by the computer device, of the device health score via the user interface, wherein the device management data comprises: hard drive capacity, hard drive speed, days old, device ID, device name, device manufacturer, device model number, device enrollment date/time, memory total, storage total, memory available, storage available, and charge status.

2. The method of claim 1, wherein the device monitoring data comprises: application usage, application performance, application faults, application latency, resource utilization, hard drive usage percent, number of hard drive errors, average memory usage, average CPU usage, and hours powered on.

3. The method of claim 1, wherein the unstructured data comprises free-form text included in tickets from a service desk.

4. The method of claim 1, wherein the unstructured data comprises: social media data; repair depot data; and audio data.

5. The method of claim 1, wherein the classifying the unstructured data comprises:
sending the unstructured data to a cognitive computing system, wherein the cognitive computing system comprises a server that is separate from the computer device and that communicates with the computer device via a network; and
receiving the classified unstructured data from the cognitive computing system.

6. The method of claim 1, wherein the classifying the unstructured data comprises applying at least one of semantic text analysis, and machine learning techniques to analyze the unstructured data.

7. The method of claim 1, wherein the scoring function is based on parameters that correspond to the categories.

8. The method of claim 7, wherein the scoring function is additionally based on at least one from the group consisting of: a device role defined for the at least one user device, and a persona role defined for a user of the at least one user device.

9. The method of claim 1, wherein the determining the device health score comprises applying a weighting factor to at least one of: at least one of the parameters of the scoring function; the device role; and the persona role.

10. The method of claim 9, further comprising:
determining a health status category from a plurality of health status categories based on the device health score; and automatically making a recommendation regarding when to refresh the at least one device based on the determined health status category.

11. The method of claim 1, wherein the user input customizing the scoring function includes at least one of:
a selection of one or more parameters that are used in the scoring function; and
values of respective ones of weighting factors used in the scoring function;
wherein the computer device receives the user input from a remote computer device via a network.

12. The method of claim 1, wherein:
the at least one user device comprises a plurality of user devices;
the determining the device health score comprises determining a respective device health score for each one of the plurality of user devices; and
the user interface lists the plurality of user devices ranked according to their respective device health scores.

13. The method of claim 1, further comprising:
automatically generating a procurement recommendation based in part on the device health scores of the plurality of user devices; and
displaying the procurement recommendation in the user interface.

14. The method of claim 12, wherein the user interface further displays respective counts of the plurality of user devices in each of a plurality of predefined health status categories, and user-selectable options for configuring threshold values that define the respective predefined health status categories.

15. The method of claim 1, wherein the user interface further displays user-selectable options for configuring threshold values for each of the predetermined health status categories.

16. A computer program product for device refresh determination, the computer program product comprising a computer readable storage medium having program instructions embodied therewith, the program instructions executable by a computing device to cause the computing device to:
obtain, by a processor of the computing device and from at least one structure data source, structured data associated with a plurality of user devices, wherein the obtaining the structured data comprises: obtaining device management data from a device management server using an application program interface (API) call; and
obtaining device monitoring data from a device monitoring server using another API call;
receive, from at least one unstructured data source, unstructured data associated with the plurality of user devices;
classify the unstructured data into categories included in a scoring function, wherein the classifying the unstructured data comprises analyzing the unstructured data using machine learning;
selectively store the classified unstructured data based on classifications of the classified unstructured data matching parameters of the scoring function;
normalize the structured data and the classified unstructured data;
generate a user interface including options for customizing the scoring function;
receiving user input customizing the scoring function;
determine, using the customized scoring function, a respective device health score for each of the plurality of user devices based on machine learning and the normalized structured data and the normalized classified unstructured data, wherein the determining is performed on-demand based on user input received via the user interface; and causing the display of each of the plurality of user devices ranked according to the respective device health scores via the user interface, wherein the device management data comprises: hard drive capacity, hard drive speed, days old, device ID, device name, device manufacturer, device model number, device enrollment date/time, memory total, storage total, memory available, storage available, and charge status.

17. The computer program product of claim 16, wherein:

the unstructured data comprises at least one from the group consisting of: free-form text included in tickets from a service desk; social media data; repair depot data; and audio data; and the classifying the unstructured data comprises applying at least one from the group consisting of: natural language understanding (NLU), semantic text analysis, and machine learning techniques.

18. A refresh system comprising:

a refresh server comprising a processing unit, a computer readable memory, a computer readable storage medium, and a tiered architecture including:

a data layer configured to store: (i) structured data obtained from at least one structured data source, the structured data being associated with a plurality of user devices; (ii) classify unstructured data obtained from at least one unstructured data source into categories included in a scoring function, wherein the classifying the unstructured data comprises analyzing the unstructured data using machine learning; and (iii) selectively store the classified unstructured data based on classifications of the classified unstructured data matching parameters of the scoring function, the unstructured data being associated with the plurality of user devices;

a business layer configured to: (i) obtain the classified unstructured data; (ii) normalize the structured data and the classified unstructured data; and (iii) determine, using a customizable scoring function, a respective device health score for each of the plurality of user devices based on machine learning, the normalized structured data and the normalized classified unstructured data, wherein the determining is performed on-demand based on user input received via a user interface and based on user-selected options for customizing the customizable scoring function; and a presentation layer configured to generate user interface that displays: (i) each of the plurality of user devices ranked according to the respective device health scores; (ii) respective counts of the plurality of user devices in each of a plurality of predefined health status categories; (iii) the user-selectable options for customizing the scoring function, wherein changes to the user-selectable options for customizing the scoring function result in changes to the respective device health scores displayed on the user interface; and (iv) at least one refresh recommendation, wherein the refresh server obtains the structured data by: obtaining device management data from a device management server using an application program interface (API) call; and obtaining device monitoring data from a device monitoring server using another API call;

the refresh server obtains the classification of the unstructured data by analyzing the unstructured data using natural language understanding (NLU); and the device monitoring data comprises: application usage, application performance, application faults, application latency, resource utilization, hard drive usage percent, number of hard drive errors, average memory usage, average CPU usage, and hours powered on.

19. The system of claim 18, wherein:

the unstructured data comprises at least one from the group consisting of: free-form text included in tickets from a service desk; social media data; repair depot data; and audio data;

the classifying the unstructured data comprises applying at least one from the group consisting of: semantic text analysis, and machine learning techniques; and the user-selectable options for customizing the scoring function comprise at least one selected from the group consisting of: parameters of the scoring function that correspond to categories of the structured data; and weight values for each of the parameters of the scoring function.

20. The system of claim 18, wherein the user interface further displays user-selectable options for configuring threshold values for each of the predetermined health status categories.

* * * * *